United States Patent
Verhoeven

(10) Patent No.: US 9,809,362 B2
(45) Date of Patent: Nov. 7, 2017

(54) FASTENER WITH EMBEDDED IDENTIFIER CIRCUIT

(71) Applicant: NXP B.V., Eindhoven (NL)

(72) Inventor: Henri Verhoeven, Someren (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/839,809

(22) Filed: Aug. 28, 2015

(65) Prior Publication Data

US 2016/0060009 A1    Mar. 3, 2016

(30) Foreign Application Priority Data

Aug. 29, 2014 (EP) ..................................... 14182902

(51) Int. Cl.
| | |
|---|---|
| G06K 19/06 | (2006.01) |
| B65D 63/10 | (2006.01) |
| G06K 19/077 | (2006.01) |
| G09F 3/03 | (2006.01) |
| H01Q 1/22 | (2006.01) |

(52) U.S. Cl.
CPC ..... *B65D 63/1027* (2013.01); *G06K 19/0775* (2013.01); *G06K 19/07758* (2013.01); *G06K 19/07762* (2013.01); *G06K 19/07783* (2013.01); *G06K 19/07798* (2013.01); *G09F 3/037* (2013.01); *G09F 3/0335* (2013.01); *H01Q 1/2225* (2013.01); *B65D 2563/108* (2013.01)

(58) Field of Classification Search
CPC ....... G06K 19/07749; G06K 19/07758; G06K 7/0017

USPC ............... 235/492, 462.46; 340/572.1, 572.5
See application file for complete search history.

(56) References Cited

U.S. PATENT DOCUMENTS

| | | | | |
|---|---|---|---|---|
| 4,306,415 | A | * | 12/1981 | Hochstein ............... F03G 7/065 60/527 |
| 5,387,250 | A | * | 2/1995 | Solbeck ................ B25B 25/005 24/16 PB |
| 5,406,263 | A | | 4/1995 | Tuttle |
| 5,969,613 | A | * | 10/1999 | Yeager ................ E05B 73/0017 340/568.1 |
| 7,202,788 | B2 | * | 4/2007 | Shieh ................. B65D 63/1081 340/572.1 |
| 8,593,258 | B2 | * | 11/2013 | Cheng ................ G06K 19/0739 340/10.1 |

(Continued)

FOREIGN PATENT DOCUMENTS

| | | |
|---|---|---|
| CN | 2705417 Y | 6/2005 |
| CN | 101964069 B | 2/2011 |
| CN | 201796871 U | 4/2011 |

(Continued)

OTHER PUBLICATIONS

Extended European Search Report for Patent Appln. No. 14182902.8 (dated Dec. 19, 2014).

*Primary Examiner* — Daniel St Cyr

(57) ABSTRACT

A fastener with a head element that is coupled to a strip element is disclosed. The strip element is configured to fasten to the head element via an attachment structure of the head element. An identification device is molded into the fastener. The identification device has an identifier integrated circuit (IC) within an IC package and an antenna, having a portion internal to the IC package and a portion extending out of the IC package, coupled to the identifier IC.

20 Claims, 7 Drawing Sheets

(56) References Cited

U.S. PATENT DOCUMENTS

2006/0087431 A1     4/2006   Shieh et al.
2010/0277288 A1    11/2010   Cheng

FOREIGN PATENT DOCUMENTS

| EP | 0565022 A1 | 10/1993 |
|----|------------|---------|
| EP | 2 590 154 A1 | 5/2013 |
| JP | 3110965 U | 7/2005 |
| JP | 4542472 B2 | 1/2007 |
| JP | 2014 154134 A | 8/2014 |
| WO | 2007/149995 A2 | 12/2007 |

* cited by examiner

FASTENER WITH EMBEDDED IDENTIFIER CIRCUIT

CROSS-REFERENCE TO RELATED APPLICATIONS

This application claims the priority under 35 U.S.C. §119 of European patent application no. 14182902.8, filed on Aug. 29, 2014, the contents of which are incorporated by reference herein.

FIELD

This invention relates to fasteners having integrated circuits embedded therein.

BACKGROUND

Zip ties, also known as cable ties or tie-wraps, are a type of fastener (typically formed from plastic) wherein the zip tie can be fastened around a structure by inserting a first end of the zip tie through a second end of the zip tie to form a closed loop around the structure. Typically, once the first end is inserted into the second end, the zip tie can be tightened, but cannot be removed without cutting or destroying the zip tie. Because zip ties cannot typically be removed without being cut or destroyed, zip ties have been used for tagging or identification. For example, an NFC chip can be attached to a zip tie that is fastened to a suitcase or a storage chest for easy identification of the suitcase or storage chest.

Additionally, zip ties can be used as tamper indicators. For example, a zip tie fastened through zippers on a suitcase such that the suitcase cannot be opened without cutting the zip tie can be used to indicate if the suitcase has been opened. For example, if the zip tie has been cut, then it will be apparent that the suitcase has been tampered with. However, it may be possible to cut and remove a zip tie and then re-fasten the zip tie without any apparent signs that the zip tie was cut if the cut is made at specific locations. For example, if a plastic zip tie is cut where the head meets the strip, the strip may be able to be refused to the head without an obvious indication that the strip had been cut.

SUMMARY

In an embodiment, a fastener with a head element that is coupled to a strip element is disclosed. The strip element is configured to fasten to the head element via an attachment structure of the head element. An identification device is molded into the fastener. That is to say, the identification device forms a molding at least partly within the fastener. The identification device has an identifier integrated circuit (IC) within an IC package and an antenna, having a portion internal to the IC package and a portion extending out of the IC package, coupled to the identifier IC.

In a second embodiment, a zip tie having a head element that is coupled to a strip element is disclosed. The strip element is configured to fasten to the head element via feeding the strip element through a channel in the head element. An identification device is molded into the zip tie. The identification device has an identifier IC within an IC package and an antenna, having a portion internal to the IC package and a portion extending out of the IC package, coupled to the identifier IC.

In a third embodiment, a fastener with a head element that is coupled to a strip element is disclosed. The strip element is configured to fasten to the head element via an attachment structure of the head element. An NFC device is molded into the fastener. The NFC device has an NFC IC within an IC package and an antenna, having a portion internal to the IC package and a portion extending out of the IC package, coupled to the IC package.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
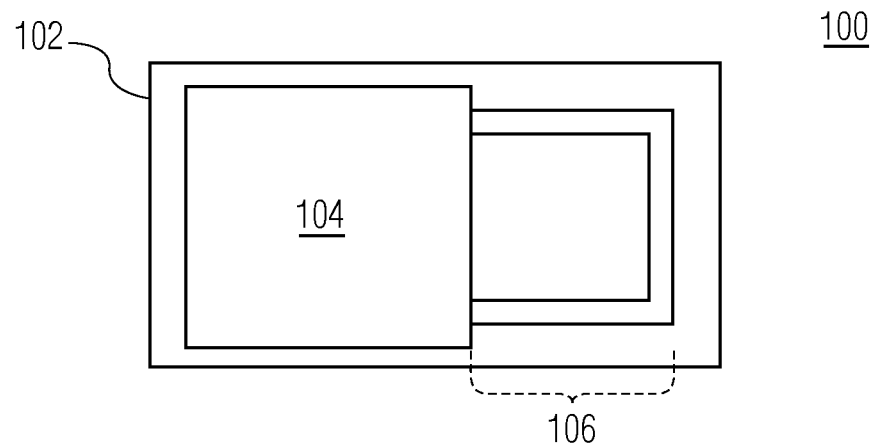
FIG. 1 depicts an NFC device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Fasteners can be configured to store identification information and can be fastened to an object for tracking and identification. For example, an identification device (such as an NFC device or other RFID-based device), having an identifier integrated circuit (IC) and an antenna packaged together, can be coupled to a zip tie and configured to store identification information for an owner of a suitcase. The zip tie can then be fastened to the suitcase and tracked through an airport luggage system by an external reader receiving communications from, for example, the NFC device.

FIG. 1 depicts an example of an identification device 100, referred to herein as an NFC device. In the example, the NFC device includes an identifier IC 104 or "chip" (also referred to as an NFC IC) and a closed-loop antenna 106 in an IC package 102. When the NFC device is attached to a part of a fastener, both the NFC IC and the antenna are attached to the same part of the fastener (e.g., the head or the strip of a zip tie.)

In addition to tracking and identifying an object, fasteners can be used to indicate tampering. Typically, tampering is indicated when an NFC device attached to a part of a fastener is removed, swapped, modified, or destroyed. For example, if an NFC device is attached to the head of a zip tie and the NFC device is removed, then tampering may be indicated by the absence of the NFC device. Tampering that does not affect the NFC device can go undetected. For example, if the NFC device is attached to the head of a zip tie, and the strip is cut and repaired (i.e., the zip tie is tampered with), the cut in the strip of the zip tie may not trigger indication of tampering because the NFC device is not affected.

In accordance with an embodiment of the invention, an NFC device having an IC package and an antenna having a portion of the antenna internal to the IC package (internal antenna portion) and a portion of the antenna external to the IC package (external antenna portion) is molded into a fastener having a head element and a strip element. Molding an NFC device with an external antenna portion into a faster provides an indication of tampering if the external portion of the antenna is damaged as a result of tampering. In an embodiment, the IC package is molded into the head element and at least some of the external antenna portion is molded into the strip element. In such a configuration, the external antenna portion may be severed if the fastener is severed, thereby rendering the NFC device inoperable.

Figure 2:
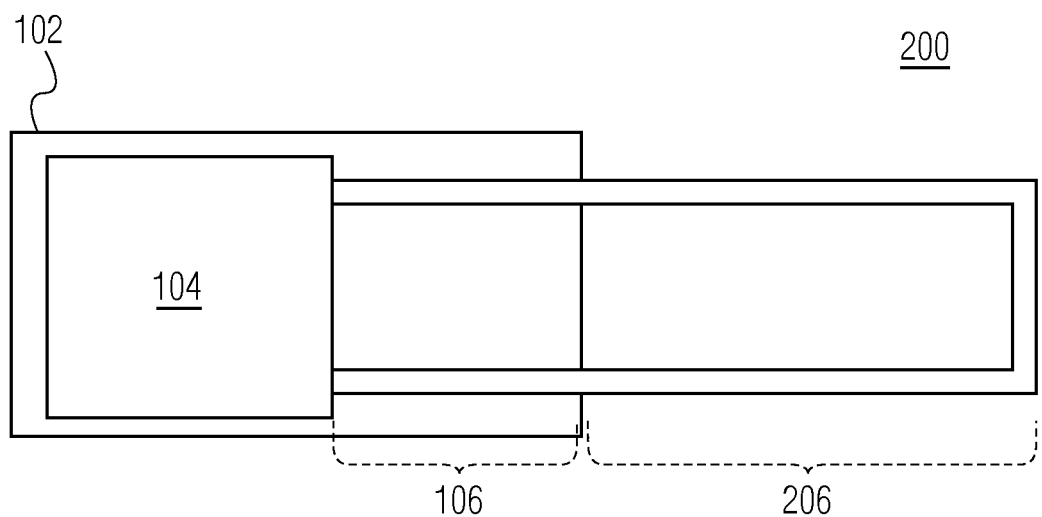
FIG. 2 depicts an NFC device that includes an external antenna portion.

FIG. 2 depicts an NFC device 200 having an NFC IC 104 and an internal antenna portion 106 within an IC package 102 and an external antenna portion 206. As shown in FIG. 2, the NFC IC and the internal antenna portion are located within the IC package. When a fastener is fabricated, the IC package can be molded into a first part of the fastener and at least some of the external antenna portion can be molded into a second part of the fastener. For example, at least some of the external antenna portion is molded into the strip part of the fastener such that if a head part of the fastener is separated from the strip part of the fastener (e.g., a malicious act), then the antenna will be severed and the NFC device will not function properly. Thus, tampering can be indicated if the external antenna portion is separated from the IC package or if the IC package is disabled (e.g., removed, swapped, modified, or destroyed.)

Figure 3A:
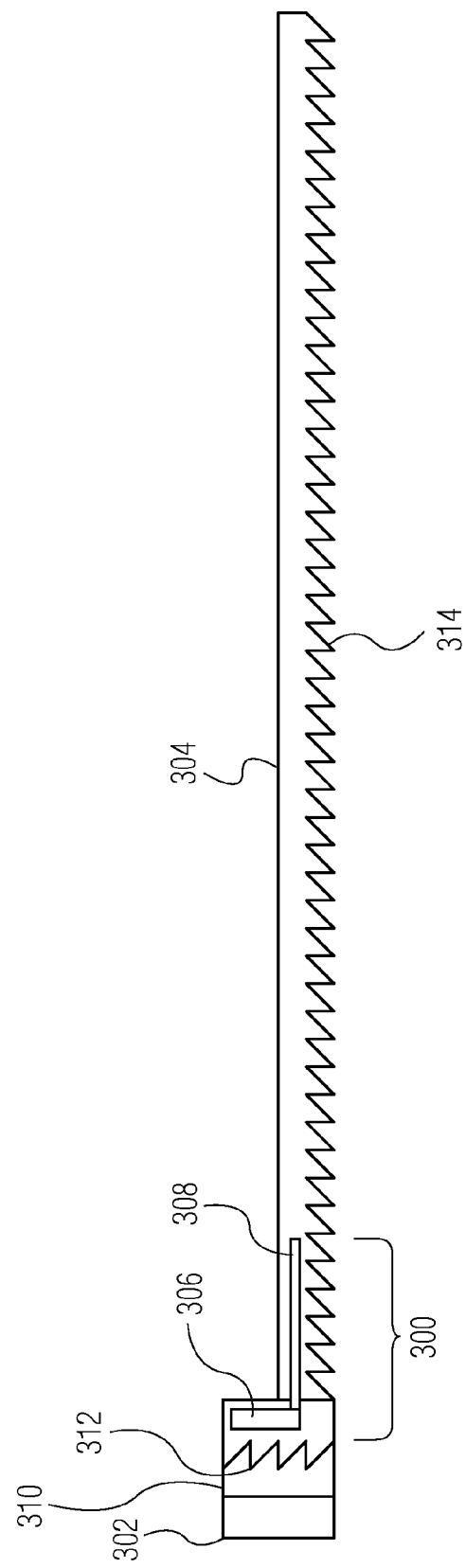
FIG. 3A is a side cutaway view of a fastener in which an NFC device has been molded into a head element of the fastener and an external portion of the antenna has been molded into a strip element of the fastener in accordance with an embodiment of the invention.

FIG. 3A is a side cutaway view of a fastener in which an NFC device 300 has been molded into a head element 302 and into a strip element 304 of the fastener. The head element includes a channel 310 having a tang 312 that locks with teeth 314 on the strip element. In other embodiments, the head element can be any attachment structure by which the strip element can be fastened to the head element. As illustrated in FIG. 3A, the IC package 306 has been molded into the head element and most of the external antenna portion 308 has been molded into the strip element. In the embodiment of FIG. 3A, the IC package and the external antenna portion have dimensions such that the IC package and external antenna portion can be fully encased within the fastener. That is, no part of the NFC device is exposed to the outside environment. Additionally, the dimensions of the external antenna portion are such that the fastener can be bent and fastened without frustrating the ability of the external antenna portion to properly receive RFID signals. In an embodiment, the maximum length of the external antenna portion is such that the bend radius of the external antenna portion is equal to or less than the bend radius of the portion of the fastener in which the external antenna portion is encased. For example, if a 2 mm external antenna portion has a bend radius equal to a 2 mm portion of a strip element, then the external antenna portion can have a maximum length of up to 2 mm long because, when the external antenna portion is 2 mm or less, bending the strip element will not accidently frustrate the ability of the external antenna portion to properly receive signals.

Figure 3B:
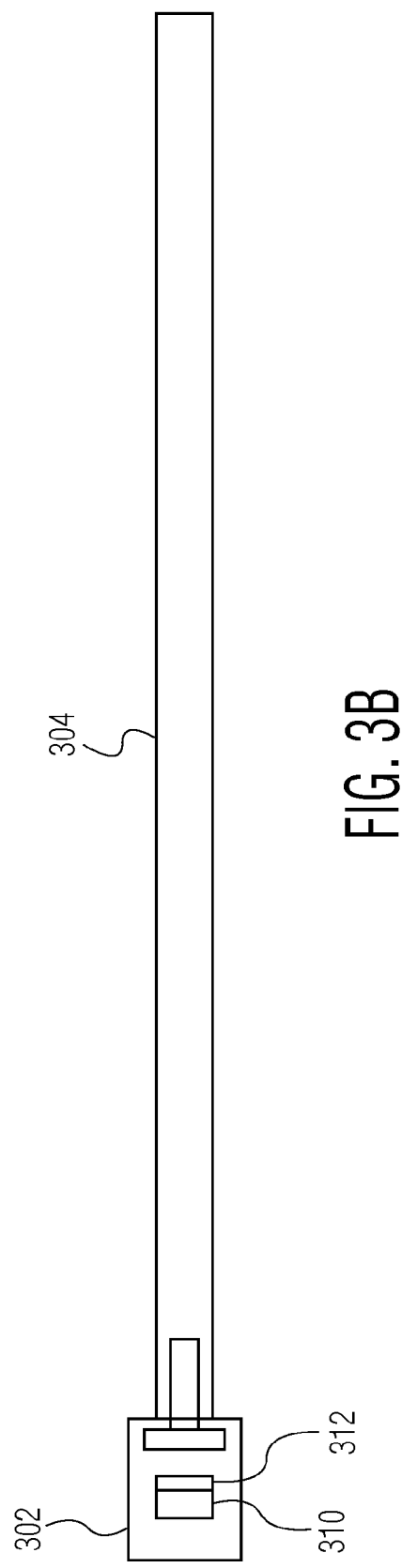
FIG. 3B is a top view of the fastener of FIG. 3A with an overlay indicating the positioning of the NFC device within the fastener.

FIG. 3B is a top view of the fastener of FIG. 3A with an overlay indicating the positioning of the NFC device within the fastener. The fastener can be fastened to an object by wrapping the strip element 304 around the object and inserting the strip element into the channel 310. Once the fastener is fastened, the tang 312 locks with the teeth on the strip element and prevents the strip element from being removed from the channel.

Molding the NFC device of FIG. 2 into the fastener, as illustrated in FIGS. 3A and 3B, can protect against tampering in at least two ways. First, an attempt to remove the NFC device from the fastener will likely break and separate the external antenna portion from the IC package. For example, if the IC package is removed from the fastener by an attacker using a razor blade to cut around the IC package, then the NFC device will no longer function if the external antenna portion is severed when the IC package is removed from the fastener. Second, an attempt to cut the strip (e.g., near the head where the cut may go unnoticed) will likely sever the external antenna portion from the IC package. For example, if the fastener on a suitcase is cut near the head and then reattached to a different suitcase (e.g., by re-fusing the strip to the head at the cut), then the external antenna portion will likely have been severed from the IC package, rendering the NFC device inoperable.

Figure 4A:
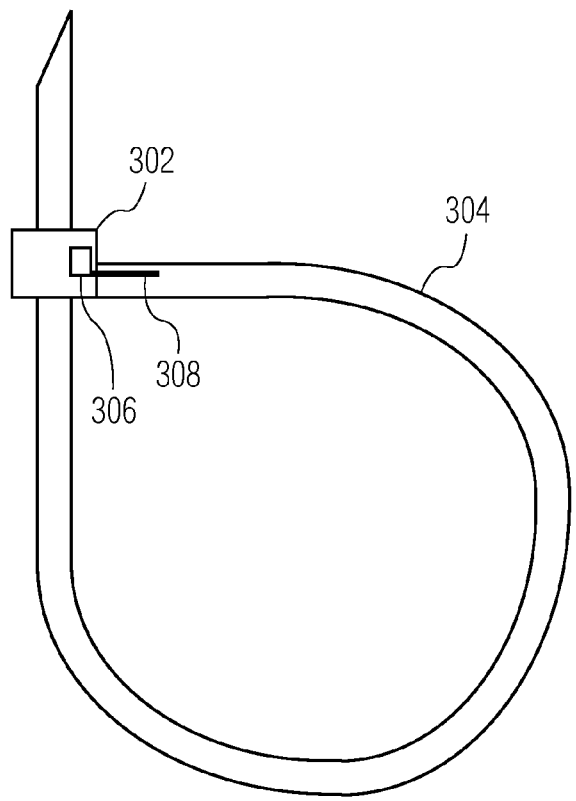
FIG. 4A is an illustration of the fastener of 3A and 3B in a fastened state.
Figure 4B:
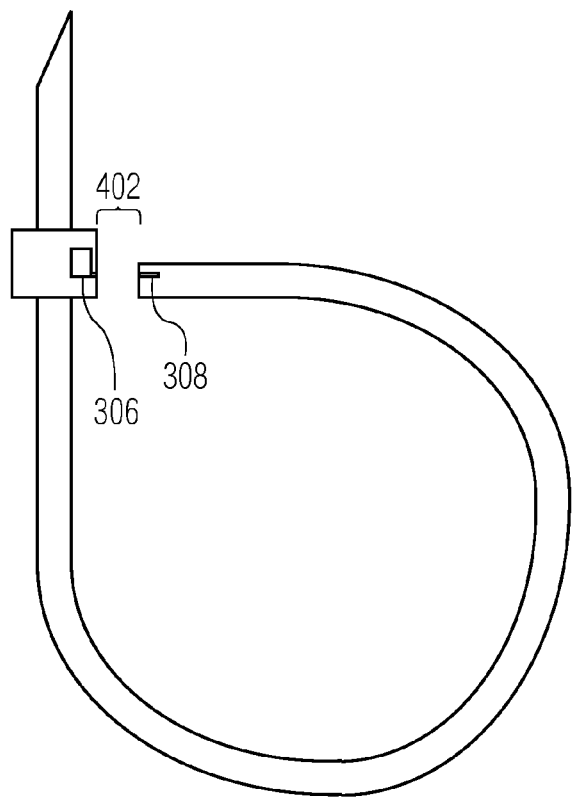
FIG. 4B is an illustration of the fastener of FIG. 4A after a discrete cut has been made.

FIG. 4A is an illustration of the fastener of FIGS. 3A and 3B in a fastened state. So configured, the strip element 304 is typically wrapped around an object and inserted into the channel 310 (FIGS. 3A/3B) in the head element 302 of the fastener such that the fastener cannot be slipped off of the object (e.g., by tightening the fastener snuggly around the object or by fastening the fastener though a handle or other closed loop on the object.) Thus, removal of the fastener will likely be limited to cutting or otherwise destroying the fastener. However, it may be possible to remove a fastener and then reattach the fastener leaving little to no evidence of the act. For example, FIG. 4B is an illustration of the fastener of FIG. 4A after a discrete cut 402 has been made at or near a location where the strip element can be reattached while leaving little to no evidence of the act. Typically, an NFC device is attached to one part of the fastener and, if the NFC device is attached to the head element, there will be no indication of the cutting because the IC package will not have been modified or damaged. Additionally, if the cut NFC device is reattached, the NFC device may still look similar to FIG. 4A. However, such a cut to the fastener as illustrated in FIG. 4B will be indicated because the cut severs the external antenna portion 308 from the IC package 306. As described above, severing the external antenna portion from the IC package prevents the antenna from functioning and disables the NFC device even if the strip element is re-attached to the head element with little to no evidence of the tampering. Thus, damaging the antenna such that the NFC device no longer operates properly provides an indication that the fastener has been tampered with.

Figure 5A:
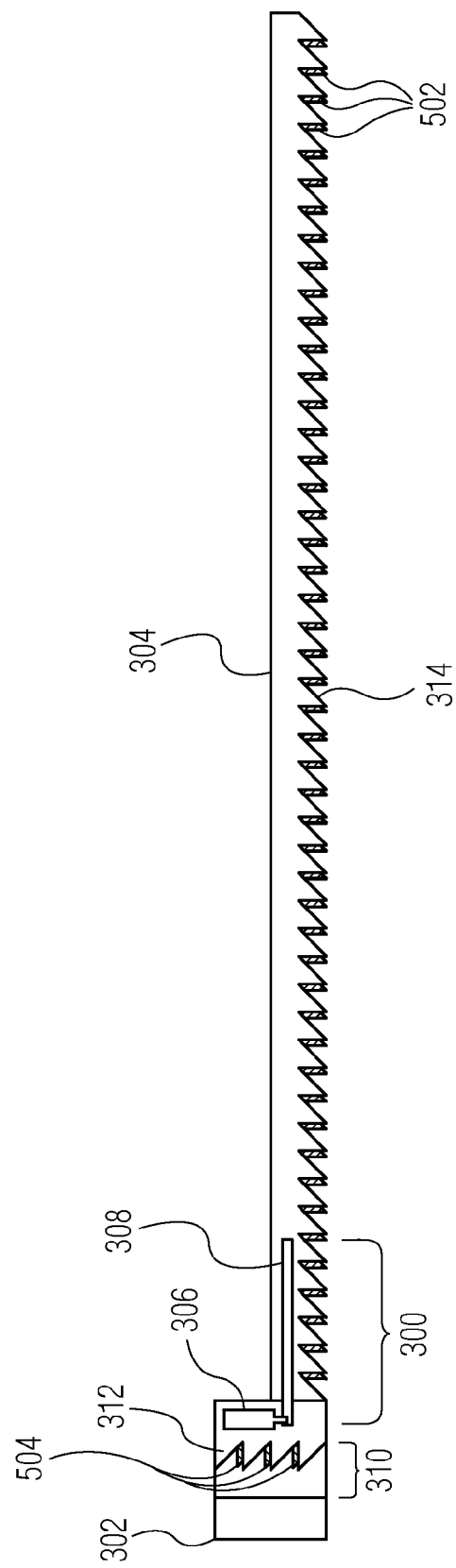
FIG. 5A is a side view of the fastener of FIG. 3A layered with reactive material.
Figure 5B:
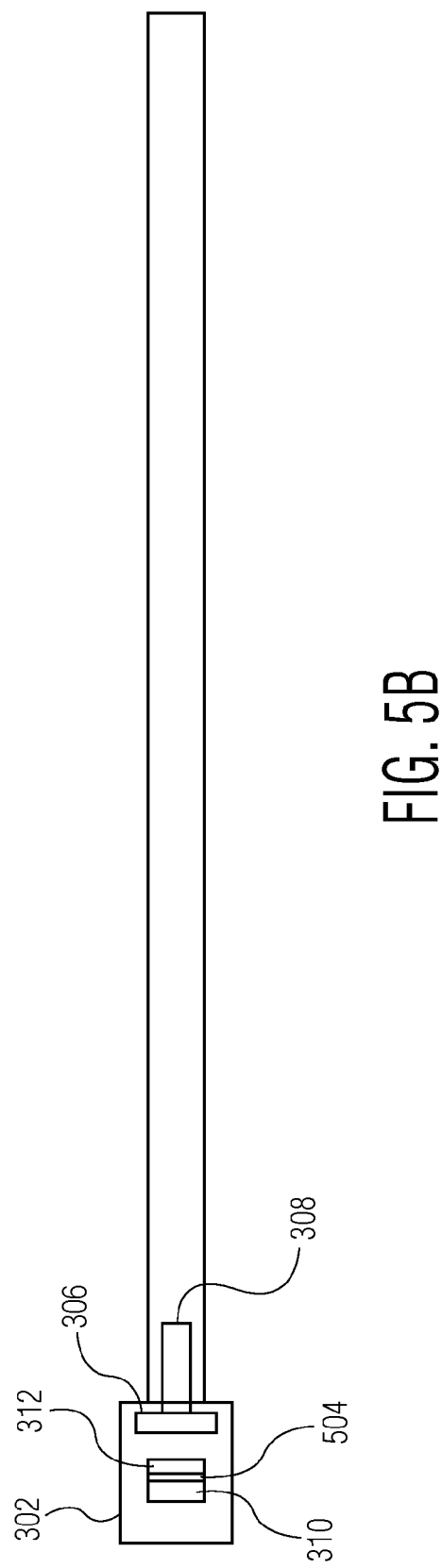
FIG. 5B is a top view of the fastener of FIG. 3B with reactive material layered along the channel.

In another embodiment, a fastener can include reactive elements that allow the strip element to be fused to a head element after the tang has locked with the teeth. FIGS. 5A and 5B are illustrations of the fastener of FIGS. 3A and 3B in which a layer of reactive material 502 is included between the teeth 314 of the strip element 304 and a layer of reactive material 504 is included along the channel 310 of the head element 302. In an example, when the strip element is inserted into the channel, the tang 312 engages with the teeth to lock the strip element in the channel. Once the strip element is locked, the reactive material on the tang reacts with reactive material between the teeth to fuse the strip element to the head element. Once fused, the strip element cannot be removed from the channel or detached from the head element without cutting the fastener. In an embodiment, the reactive material can be a glue, a UV sensitive top layer, a temperature sensitive top layer, or other reactive or adhesive material by which the head element and the strip element can be fused together. Although illustrated on both the head element and the strip element in FIGS. 5A and 5B, in another embodiment, the reactive material can be layered on either the head element or the strip element.

Figure 6:
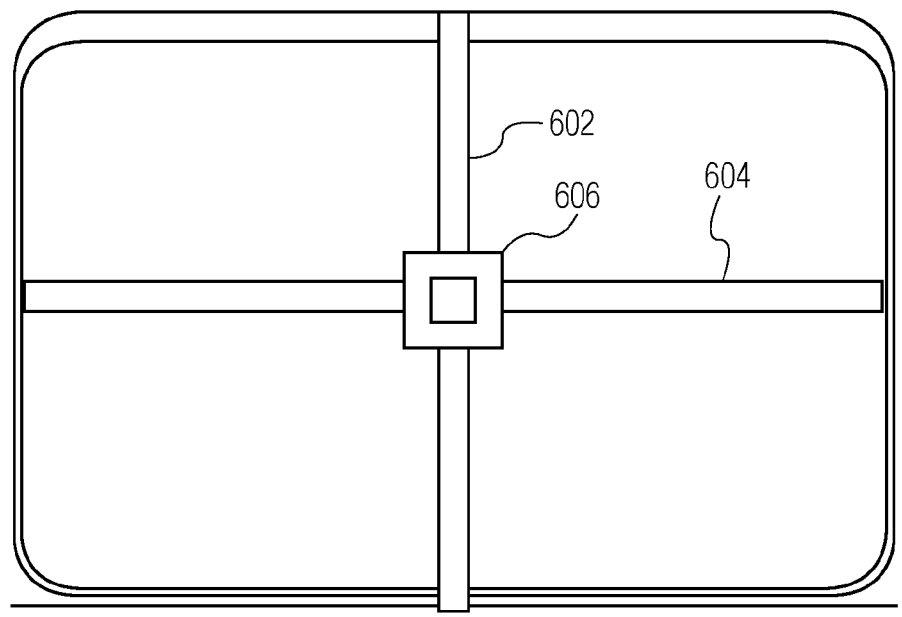
FIG. 6 is a block diagram of a fastener with multiple fastened strips.

In addition to the configurations described above with reference to FIGS. 3A, 3B, 4A, 4B, 5A, and 5B, the fastener can be configured with multiple strip elements 604 as illustrated in FIG. 6. In the embodiment of FIG. 6, two strip elements 602, 604 are connected to a common head element 606 on adjoining faces of the head element. In other embodiments, the two strip elements can be connected to the common head element in arrangements other than as illustrated in FIG. 6 and additional strip elements can also be connected to the common head element. When put into use, each strip element is looped around, for example, an object and inserted into its respective channel on the head element. In order to enable the fastener to indicate tampering with either of the strip elements, the external antenna portion can be configured to be molded into each of the multiple strip elements.

Figure 7:
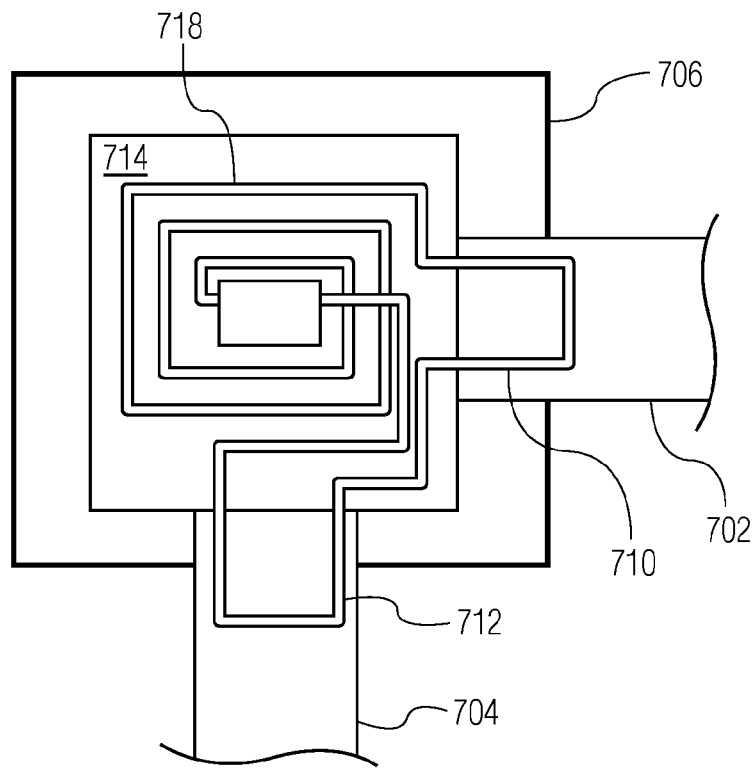
FIG. 7 is an illustration of an NFC device having an external antenna portion with the external antenna portion molded into multiple strips of a fastener in accordance with an embodiment of the invention.

FIG. 7 is an illustration of a fastener that includes an NFC device molded into a head element 706 and multiple external antenna portions 710, 712 molded into multiple corresponding strip elements 702, 704. The NFC device includes an IC package 714 (here, including an NFC IC 716 and an internal antenna portion 718) and two external antenna portions 710, 712. The IC package is molded into the head element and one external antenna portion is molded into each of the two strip elements. The internal antenna portion and both external antenna portions form a single closed-loop antenna. Thus, cutting either strip element at or near the head element may sever the antenna and prevent the antenna from functioning. Severing of the antenna would indicate that the fastener has been tampered with.

Although particular fasteners and identification devices are shown and described herein, additional embodiments of the invention may be implemented by other fasteners and identification devices (e.g., RFID devices). As an example, an embodiment of the invention could be implemented using an RFID tag attached to a buckle-type attachment structure.

The present disclosure extends to the following series of lettered clauses: (A) A zip tie, the zip tie comprising a head element having a channel, a strip element coupled to the head element and configured to fasten to the head element via feeding the strip element through the channel, and an identification device molded into the zip tie, the identification device comprising an identifier integrated circuit (IC) within an IC package and an antenna coupled to the identifier IC, the antenna having a portion internal to the IC package and a portion external to the IC package; (B) the zip tie of clause (A), wherein the IC package is molded into the head element and at least a portion of the antenna external to the IC package is molded into the strip element; (C) the zip tie of clause (A), wherein the identification device is a NFC device and the identifier IC is a NFC IC; (D) the zip tie of clause (A), wherein at least part of the external portion of the antenna extends into the strip element such that severing the strip element from the head element severs the antenna; (E) the zip tie of clause (A), wherein the zip tie comprises a plurality of strip elements and at least a portion of the external antenna is embedded in the plurality of strip elements; (F) the zip tie of clause (A), further comprising a layer of reactive material on the strip element and a layer of reactive material on the attachment structure, wherein the strip element is fused to the head element when the layer of reactive material on the strip element reacts with the layer of reactive material on the attachment structure; (G) the zip tie of clause (A), wherein the identification device is fully encased within the zip tie; (H) the zip tie of clause (A), wherein the bend radius of the portion of the antenna external to the IC package is equal to or less than the bend radius of the portion of the zip tie in which the identification device is molded; (I) a fastener, the fastener comprising a head element having an attachment structure, a strip element coupled to the head element and configured to fasten to the head element via the attachment structure, and an NFC device molded into the fastener, the NFC device comprising an NFC integrated circuit (IC) within an IC package and an antenna coupled to the NFC IC, the antenna having a portion internal to the IC package and a portion external to the IC package; (J) the fastener of clause (I), wherein the IC package is molded into the head element and at least a portion of the antenna external to the IC package is molded into the strip element; (K) the fastener of claim (I), wherein at least part of the external portion of the antenna extends into the strip element such that severing the strip element from the head element severs the antenna (K) the fastener of clause (I), wherein the NFC device is fully encased within the fastener.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A fastener, the fastener comprising:
a head element having an attachment structure;
a strip element including a portion coupled to the head element and an end configured to fasten to the head element via the attachment structure; and
an identification device including circuitry and molded into the fastener, the identification device comprising:
an identifier integrated circuit (IC) within an IC package; and
an antenna coupled to the identifier IC, the antenna having a portion internal to the IC package and a portion external to the IC package that extends into the portion of the strip element, wherein a bend radius of the portion of the antenna external to the IC package is equal to or less than a bend radius of the portion of the strip element in which the portion of the antenna is molded.

2. The fastener of claim 1, wherein the IC package is molded into the head element and at least the portion of the antenna external to the IC package is molded into the portion of the strip element and does not extend to the end of the strip element.

3. The fastener of claim 1, wherein the identification device is a NFC device and the identifier IC is a NFC IC, and wherein the fastener is coupled to a suitcase or storage chest, and the NFC device is inoperable responsive to tampering with the fastener which severs the antenna from the NFC IC.

4. The fastener of claim 1, wherein at least part of the external portion of the antenna extends into the strip element such that severing the strip element from the head element severs the antenna.

5. The fastener of claim 1, wherein the fastener comprises a plurality of strip elements and at least a portion of the external antenna is embedded in the plurality of strip elements.

6. The fastener of claim 1, further comprising a layer of reactive material on the strip element and a layer of reactive material on the attachment structure, wherein the strip element is fused to the head element when the layer of reactive material on the strip element reacts with the layer of reactive material on the attachment structure.

7. The fastener of claim 1, wherein the identification device is fully encased within the fastener.

8. The fastener of claim 1, wherein the portion of the antenna external to the IC package is molded into a length of the portion of the strip element.

9. A zip tie, the zip tie comprising: a head element having a channel; a strip element including a portion coupled to the head element and an end configured to fasten to the head element via feeding the strip element through the channel; and an identification device including circuitry and molded into the zip tie, the identification device comprising: an identifier integrated circuit (IC) within an IC package; and an antenna coupled to the identifier IC, the antenna having a portion internal to the IC package and a portion external to the IC package that extends to a length into the portion of the strip element, wherein a bend radius of the portion of the antenna external to the IC package is equal to or less than a bend radius of the portion of the trip element in which the portion of the antenna is molded.

10. The zip tie of claim 9, wherein the IC package is molded into the head element and at least a portion of the antenna external to the IC package is molded into the portion of the strip element to the length and the antenna does not extend to the end of the strip element.

11. The zip tie of claim 9, wherein the identification device is a NFC device and the identifier IC is a NFC IC.

12. The zip tie of claim 9, wherein at least part of the external portion of the antenna extends into the strip element such that severing the strip element from the head element severs the antenna.

13. The zip tie of claim 9, wherein the zip tie comprises a plurality of strip elements and at least a portion of the external antenna is embedded in the plurality of strip elements.

14. The zip tie of claim 9, further comprising a layer of reactive material on the strip element and a layer of reactive material on the attachment structure, wherein the strip element is fused to the head element when the layer of reactive material on the strip element reacts with the layer of reactive material on the attachment structure.

15. The zip tie of claim 9, wherein the identification device is fully encased within the zip tie.

16. The zip tie of claim 9, wherein a portion of the antenna external to the IC package is molded into the portion of the strip element and the bend radius of the portion of the antenna external to the IC package is equal to or less than the bend radius of the portion of the strip element in which the portion of the antenna is molded.

17. A fastener, the fastener comprising: a head element having, an attachment structure; a strip element including a portion coupled to the head element and an end configured to fasten to the head element via the attachment structure; and an NFC device including circuitry and molded into the fastener, the NFC device comprising: an NFC integrated circuit (IC) within an IC package; and an antenna coupled to the NFC IC, the antenna having a portion internal to the IC package and a portion external to the IC package extends to a length into the portion of the strip element, wherein a bend radius of the portion of the antenna external to the IC package is equal to or less than a bend radius of the portion of the trip element in which the portion of the antenna is molded.

18. The fastener of claim 17, wherein the IC package is molded into the head element and at least a portion of the antenna external to the IC package is molded into the strip element.

19. The fastener of claim 17, wherein at least part of the external portion of the antenna extends into the strip element such that severing the strip element from the head element severs the antenna.

20. The fastener of claim 17, wherein the NFC device is fully encased within the fastener.

\* \* \* \* \*